US007825780B2

(12) United States Patent
Pitt

(10) Patent No.: US 7,825,780 B2
(45) Date of Patent: Nov. 2, 2010

(54) CELLULAR AUGMENTED VEHICLE ALARM NOTIFICATION TOGETHER WITH LOCATION SERVICES FOR POSITION OF AN ALARMING VEHICLE

(75) Inventor: Lance Douglas Pitt, Kent, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 64 days.

(21) Appl. No.: 11/295,632

(22) Filed: Dec. 7, 2005

(65) Prior Publication Data

US 2007/0075849 A1    Apr. 5, 2007

Related U.S. Application Data

(60) Provisional application No. 60/723,448, filed on Oct. 5, 2005.

(51) Int. Cl.
B60R 25/10 (2006.01)
(52) U.S. Cl. .............. 340/426.18; 340/426.2; 340/426.19; 342/357.07; 342/457; 455/426.1
(58) Field of Classification Search .............. 340/426.2, 340/426.21, 426.19, 426.1, 426.18; 455/426.1; 709/203; 342/357.07, 457
See application file for complete search history.

(56) References Cited

U.S. PATENT DOCUMENTS

| 4,445,118 | A |   | 4/1984  | Taylor      |         |
|-----------|---|---|---------|-------------|---------|
| 4,928,107 | A |   | 5/1990  | Kuroda      |         |
| 4,972,484 | A |   | 11/1990 | Theile      |         |
| 5,126,722 | A |   | 6/1992  | Kamis       |         |
| 5,283,570 | A |   | 2/1994  | DeLuca      |         |
| 5,301,354 | A |   | 4/1994  | Schwendeman |         |
| 5,311,516 | A |   | 5/1994  | Kuznicki    |         |
| 5,327,529 | A |   | 7/1994  | Fults       |         |
| 5,335,246 | A |   | 8/1994  | Yokev       |         |
| 5,351,235 | A |   | 9/1994  | Lahtinen    |         |
| 5,365,451 | A |   | 11/1994 | Wang        |         |
| 5,418,537 | A |   | 5/1995  | Bird        |         |
| 5,422,813 | A |   | 6/1995  | Schuchman   |         |
| 5,479,408 | A |   | 12/1995 | Will        |         |
| 5,485,163 | A |   | 1/1996  | Singer      |         |
| 5,504,491 | A |   | 4/1996  | Chapman     |         |
| 5,506,886 | A |   | 4/1996  | Maine       |         |
| 5,515,043 | A | * | 5/1996  | Berard et al. | 340/988 |
| 5,517,199 | A |   | 5/1996  | DiMattei    |         |
| 5,530,655 | A |   | 6/1996  | Lokhoff     |         |
| 5,530,914 | A |   | 6/1996  | McPheters   |         |
| 5,539,395 | A |   | 7/1996  | Buss        |         |

(Continued)

Primary Examiner—Brent Swarthout
(74) Attorney, Agent, or Firm—William H. Bollman

(57) ABSTRACT

A cellular alarm notification signal is received wirelessly from an alarming vehicle, and a position of a cellular transceiver of the alarming vehicle is requested and provided to police, security, emergency personnel, and/or surveillance cameras. A vehicle alarm notification is sent directly to the owner of a particular vehicle immediately upon alarm, or to the police, or to building security to dispatch an investigative team, or to a building surveillance company to activate or monitor a relevant security camera. In addition to the alarming status of the vehicle, the cellular alarm notification cellular call may provide a position of the alarming vehicle to the notified party, obtained through appropriate location services provided in a wireless system to satisfy requirements for responding in a personal emergency to a requesting public safety access point (PSAP).

34 Claims, 10 Drawing Sheets

U.S. PATENT DOCUMENTS

| | | | |
|---|---|---|---|
| 5,539,829 A | 7/1996 | Lokhoff | |
| 5,546,445 A | 8/1996 | Dennison | |
| 5,568,153 A | 10/1996 | Beliveau | |
| 5,583,774 A | 12/1996 | Diesel | |
| 5,594,780 A | 1/1997 | Wiedeman | |
| 5,606,618 A | 2/1997 | Lokhoff | |
| 5,629,693 A | 5/1997 | Janky | |
| 5,633,630 A * | 5/1997 | Park | 340/992 |
| 5,636,276 A | 6/1997 | Brugger | |
| 5,661,652 A | 8/1997 | Sprague | |
| 5,661,755 A | 8/1997 | Van de Kerkhof | |
| 5,689,245 A | 11/1997 | Noreen | |
| 5,699,053 A | 12/1997 | Jonsson | |
| 5,704,029 A | 12/1997 | Wright, Jr. | |
| 5,721,781 A | 2/1998 | Deo et al. | |
| 5,731,785 A | 3/1998 | Lemelson | |
| 5,765,152 A | 6/1998 | Erickson | |
| 5,771,353 A | 6/1998 | Eggleston | |
| 5,774,670 A | 6/1998 | Montulli | |
| 5,809,415 A | 9/1998 | Rossmann | |
| 5,812,086 A | 9/1998 | Bertiger | |
| 5,812,087 A | 9/1998 | Krasner | |
| 5,841,396 A | 11/1998 | Krasner | |
| 5,857,201 A | 1/1999 | Wright, Jr. | |
| 5,864,667 A | 1/1999 | Barkam | |
| 5,874,914 A | 2/1999 | Krasner | |
| 5,896,369 A | 4/1999 | Warsta | |
| 5,898,391 A * | 4/1999 | Jefferies et al. | 340/988 |
| 5,922,074 A | 7/1999 | Richard | |
| 5,930,250 A | 7/1999 | Klok | |
| 5,945,944 A | 8/1999 | Krasner | |
| 5,946,629 A | 8/1999 | Sawyer | |
| 5,950,137 A | 9/1999 | Kim | |
| 5,960,362 A | 9/1999 | Grob | |
| 5,983,099 A | 11/1999 | Yao | |
| 5,999,124 A | 12/1999 | Sheynblat | |
| 6,032,051 A | 2/2000 | Hall | |
| 6,052,081 A | 4/2000 | Krasner | |
| 6,058,338 A | 5/2000 | Agashe et al. | |
| 6,061,018 A | 5/2000 | Sheynblat | |
| 6,064,336 A | 5/2000 | Krasner | |
| 6,067,045 A | 5/2000 | Castelloe | |
| 6,081,229 A | 6/2000 | Soliman | |
| 6,085,320 A | 7/2000 | Kaliski, Jr. | |
| 6,118,403 A | 9/2000 | Lang | |
| 6,121,923 A | 9/2000 | King | |
| 6,124,810 A | 9/2000 | Segal | |
| 6,131,067 A | 10/2000 | Girerd | |
| 6,133,874 A | 10/2000 | Krasner | |
| 6,134,483 A | 10/2000 | Vayanos | |
| 6,147,598 A | 11/2000 | Murphy | |
| 6,150,980 A | 11/2000 | Krasner | |
| 6,154,172 A | 11/2000 | Piccionelli | |
| 6,169,901 B1 | 1/2001 | Boucher | |
| 6,169,902 B1 | 1/2001 | Kawamoto | |
| 6,178,506 B1 | 1/2001 | Quick, Jr. | |
| 6,184,801 B1 * | 2/2001 | Janky | 340/988 |
| 6,185,427 B1 | 2/2001 | Krasner | |
| 6,188,354 B1 | 2/2001 | Soliman | |
| 6,188,909 B1 | 2/2001 | Alanara | |
| 6,189,098 B1 | 2/2001 | Kaliski, Jr. | |
| 6,195,557 B1 | 2/2001 | Havinis | |
| 6,204,798 B1 | 3/2001 | Fleming | |
| 6,205,330 B1 | 3/2001 | Winbladh | |
| 6,208,290 B1 | 3/2001 | Krasner | |
| 6,215,441 B1 | 4/2001 | Moeglein | |
| 6,239,742 B1 | 5/2001 | Krasner | |
| 6,247,135 B1 | 6/2001 | Feague | |
| 6,249,873 B1 | 6/2001 | Richard | |
| 6,253,203 B1 | 6/2001 | O'Flaherty | |
| 6,260,147 B1 | 7/2001 | Quick, Jr. | |
| 6,275,692 B1 | 8/2001 | Skog | |
| 6,275,849 B1 | 8/2001 | Ludwig | |
| 6,297,768 B1 | 10/2001 | Allen, Jr. | |
| 6,307,504 B1 | 10/2001 | Sheynblat | |
| 6,308,269 B2 | 10/2001 | Proidl | |
| 6,313,786 B1 | 11/2001 | Sheynblat | |
| 6,321,257 B1 | 11/2001 | Kotola | |
| 6,324,542 B1 | 11/2001 | Wright, Jr. et al. | |
| 6,327,473 B1 | 12/2001 | Soliman | |
| 6,333,919 B2 | 12/2001 | Gaffney | |
| 6,360,093 B1 | 3/2002 | Ross | |
| 6,360,102 B1 | 3/2002 | Havinis | |
| 6,363,254 B1 | 3/2002 | Jones | |
| 6,367,019 B1 | 4/2002 | Ansell | |
| 6,370,389 B1 | 4/2002 | Isomursu | |
| 6,377,209 B1 | 4/2002 | Krasner | |
| 6,400,314 B1 | 6/2002 | Krasner | |
| 6,400,958 B1 | 6/2002 | Isomursu | |
| 6,411,254 B1 | 6/2002 | Moeglein | |
| 6,421,002 B2 | 7/2002 | Krasner | |
| 6,430,504 B1 | 8/2002 | Gilbert | |
| 6,433,734 B1 | 8/2002 | Krasner | |
| 6,442,391 B1 | 8/2002 | Johansson | |
| 6,449,473 B1 | 9/2002 | Raivisto | |
| 6,449,476 B1 | 9/2002 | Hutchison, IV | |
| 6,456,852 B2 | 9/2002 | Bar | |
| 6,463,272 B1 | 10/2002 | Wallace | |
| 6,477,150 B1 | 11/2002 | Maggenti | |
| 6,505,049 B1 | 1/2003 | Dorenbosch | |
| 6,510,387 B2 | 1/2003 | Fuchs | |
| 6,512,922 B1 | 1/2003 | Burg | |
| 6,512,930 B2 | 1/2003 | Sandegren | |
| 6,515,623 B2 | 2/2003 | Johnson | |
| 6,519,466 B2 | 2/2003 | Pande | |
| 6,522,682 B1 | 2/2003 | Kohli | |
| 6,525,687 B2 | 2/2003 | Roy | |
| 6,525,688 B2 | 2/2003 | Chou | |
| 6,529,829 B2 | 3/2003 | Turetzky | |
| 6,531,982 B1 | 3/2003 | White | |
| 6,538,757 B1 | 3/2003 | Sansone | |
| 6,539,200 B1 | 3/2003 | Schiff | |
| 6,539,304 B1 | 3/2003 | Chansarkar | |
| 6,542,464 B1 | 4/2003 | Takeda | |
| 6,542,734 B1 | 4/2003 | Abrol | |
| 6,542,743 B1 | 4/2003 | Soliman | |
| 6,549,776 B1 | 4/2003 | Joong | |
| 6,549,844 B1 | 4/2003 | Egberts | |
| 6,556,832 B1 | 4/2003 | Soliman | |
| 6,560,461 B1 | 5/2003 | Fomukong | |
| 6,560,534 B2 | 5/2003 | Abraham | |
| 6,567,035 B1 | 5/2003 | Elliott | |
| 6,570,530 B2 | 5/2003 | Gaal | |
| 6,574,558 B2 | 6/2003 | Kohli | |
| 6,580,390 B1 | 6/2003 | Hay | |
| 6,584,552 B1 | 6/2003 | Kuno et al. | |
| 6,594,500 B2 | 7/2003 | Bender | |
| 6,597,311 B2 | 7/2003 | Sheynblat | |
| 6,603,973 B1 | 8/2003 | Foladare | |
| 6,606,495 B1 | 8/2003 | Korpi | |
| 6,606,554 B2 | 8/2003 | Edge | |
| 6,609,004 B1 | 8/2003 | Morse | |
| 6,611,757 B2 | 8/2003 | Brodie | |
| 6,618,670 B1 | 9/2003 | Chansarkar | |
| 6,621,452 B2 | 9/2003 | Knockeart | |
| 6,628,233 B2 | 9/2003 | Knockeart | |
| 6,633,255 B2 | 10/2003 | Krasner | |
| 6,640,184 B1 | 10/2003 | Rabe | |
| 6,650,288 B1 | 11/2003 | Pitt et al. | |
| 6,657,035 B1 | 12/2003 | Nakata | |
| 6,657,557 B1 * | 12/2003 | Hsu | 340/988 |
| 6,661,372 B1 | 12/2003 | Girerd | |
| 6,665,539 B2 | 12/2003 | Sih | |
| 6,665,541 B1 | 12/2003 | Krasner | |

| Patent No. | Date | Name | | Patent No. | Date | Name |
|---|---|---|---|---|---|---|
| 6,671,620 B1 | 12/2003 | Garin | | 6,907,224 B2 | 6/2005 | Younis |
| 6,677,894 B2 | 1/2004 | Sheynbalt | | 6,907,238 B2 | 6/2005 | Leung |
| 6,680,694 B1 | 1/2004 | Knockeart | | 6,912,395 B2 | 6/2005 | Benes |
| 6,680,695 B2 | 1/2004 | Turetzky | | 6,915,208 B2 | 7/2005 | Garin |
| 6,687,504 B1 | 2/2004 | Raith | | 6,917,331 B2 | 7/2005 | Gronemeyer |
| 6,691,019 B2 | 2/2004 | Seeley | | 6,930,634 B2 | 8/2005 | Peng |
| 6,694,258 B2 | 2/2004 | Johnson | | 6,937,141 B2 * | 8/2005 | Muramatsu ............ 340/426.13 |
| 6,697,629 B1 | 2/2004 | Grilli | | 6,937,187 B2 | 8/2005 | van Diggelen |
| 6,698,195 B1 | 3/2004 | Hellinger | | 6,937,872 B2 | 8/2005 | Krasner |
| 6,701,144 B2 | 3/2004 | Kirbas | | 6,941,144 B2 | 9/2005 | Stein |
| 6,703,971 B2 | 3/2004 | Pande | | 6,944,540 B2 | 9/2005 | King |
| 6,703,972 B2 | 3/2004 | van Diggelen | | 6,947,772 B2 | 9/2005 | Minear |
| 6,704,651 B2 | 3/2004 | Van Diggelen | | 6,950,058 B1 | 9/2005 | Davis |
| 6,707,421 B1 | 3/2004 | Drury | | 6,956,467 B1 * | 10/2005 | Mercado, Jr. ............ 340/426.2 |
| 6,714,793 B1 | 3/2004 | Carey | | 6,957,073 B2 | 10/2005 | Bye |
| 6,721,871 B2 | 4/2004 | Piispanen | | 6,961,562 B2 | 11/2005 | Ross |
| 6,724,342 B2 | 4/2004 | Bloebaum | | 6,965,754 B2 | 11/2005 | King |
| 6,725,159 B2 | 4/2004 | Krasner | | 6,965,767 B2 | 11/2005 | Maggenti |
| 6,731,940 B1 | 5/2004 | Nagendran | | 6,970,917 B1 | 11/2005 | Kushwaha |
| 6,734,821 B2 | 5/2004 | Van Diggelen | | 6,973,166 B1 | 12/2005 | Tsumpes |
| 6,738,013 B2 | 5/2004 | Orler | | 6,973,320 B2 | 12/2005 | Brown |
| 6,738,800 B1 | 5/2004 | Aguilon | | 6,975,266 B2 | 12/2005 | Abraham |
| 6,741,842 B2 | 5/2004 | Goldberg | | 6,978,453 B2 | 12/2005 | Rao |
| 6,745,038 B2 | 6/2004 | Callaway, Jr. | | 6,980,816 B2 | 12/2005 | Rohles |
| 6,747,596 B2 | 6/2004 | Orler | | 6,985,105 B1 | 1/2006 | Pitt |
| 6,748,195 B1 | 6/2004 | Phillips | | 6,996,720 B1 | 2/2006 | DeMello |
| 6,751,464 B1 | 6/2004 | Burg | | 6,999,782 B2 | 2/2006 | Shaughnessy |
| 6,753,764 B2 * | 6/2004 | Kuo .................. 340/426.2 | | 7,024,321 B1 | 4/2006 | Deniger |
| 6,756,938 B2 | 6/2004 | Zhao | | 7,024,393 B1 | 4/2006 | Peinado |
| 6,757,544 B2 | 6/2004 | Rangarajan | | 7,047,411 B1 | 5/2006 | DeMello |
| 6,772,340 B1 | 8/2004 | Peinado | | 7,064,656 B2 | 6/2006 | Belcher et al. |
| 6,775,655 B1 | 8/2004 | Peinado et al. | | 7,065,351 B2 | 6/2006 | Carter |
| 6,775,802 B2 | 8/2004 | Gaal | | 7,065,507 B2 | 6/2006 | Mohammed |
| 6,778,136 B2 | 8/2004 | Gronemeyer | | 7,071,814 B1 | 7/2006 | Schorman |
| 6,778,885 B2 | 8/2004 | Agashe | | 7,079,857 B2 | 7/2006 | Maggenti et al. |
| 6,781,963 B2 | 8/2004 | Crockett | | 7,103,018 B1 | 9/2006 | Hansen |
| 6,788,249 B1 | 9/2004 | Farmer | | 7,103,574 B1 | 9/2006 | Peinado |
| 6,795,699 B1 | 9/2004 | McCraw | | 7,106,717 B2 | 9/2006 | Rosseau |
| 6,799,050 B1 | 9/2004 | Krasner | | 7,113,128 B1 | 9/2006 | Pitt |
| 6,801,124 B2 * | 10/2004 | Naitou .................. 340/426.19 | | 7,136,838 B1 | 11/2006 | Peinado |
| 6,801,159 B2 | 10/2004 | Swope | | 7,151,946 B2 | 12/2006 | Magennti |
| 6,804,524 B1 | 10/2004 | Vandermaijden | | 7,177,623 B2 | 2/2007 | Baldwin |
| 6,807,534 B1 | 10/2004 | Erickson | | 7,209,969 B2 | 4/2007 | Lahti et al. |
| 6,810,323 B1 | 10/2004 | Bullock | | 7,218,940 B2 | 5/2007 | Niemenna |
| 6,813,560 B2 | 11/2004 | van Diggelen | | 7,221,959 B2 | 5/2007 | Lindquist |
| 6,816,111 B2 | 11/2004 | Krasner | | 7,301,494 B2 | 11/2007 | Waters |
| 6,816,710 B2 | 11/2004 | Krasner | | 7,629,926 B2 | 12/2009 | Pitt |
| 6,816,719 B1 | 11/2004 | Heinonen et al. | | 2001/0011247 A1 | 8/2001 | O'Flaherty |
| 6,816,734 B2 | 11/2004 | Wong et al. | | 2002/0037735 A1 | 3/2002 | Maggenti |
| 6,820,269 B2 | 11/2004 | Baucke et al. | | 2002/0038182 A1 | 3/2002 | Wong |
| 6,829,475 B1 | 12/2004 | Lee | | 2002/0052214 A1 | 5/2002 | Maggenti |
| 6,832,373 B2 | 12/2004 | O'Neill | | 2002/0061760 A1 | 5/2002 | Maggenti |
| 6,833,785 B2 | 12/2004 | Brown | | 2002/0069529 A1 | 6/2002 | Wieres |
| 6,839,020 B2 | 1/2005 | Geier | | 2002/0102999 A1 | 8/2002 | Maggenti |
| 6,839,021 B2 | 1/2005 | Sheynblat | | 2002/0112047 A1 | 8/2002 | Kushwaha |
| 6,842,715 B1 | 1/2005 | Gaal | | 2002/0135504 A1 | 9/2002 | Singer |
| 6,853,849 B1 | 2/2005 | Tognazzini | | 2002/0173317 A1 | 11/2002 | Nykanen |
| 6,853,916 B2 | 2/2005 | Fuchs | | 2003/0009602 A1 | 1/2003 | Jacobs |
| 6,856,282 B2 | 2/2005 | Mauro | | 2003/0037163 A1 | 2/2003 | Kitada |
| 6,861,980 B1 | 3/2005 | Rowitch | | 2003/0065788 A1 | 4/2003 | Salomaki |
| 6,865,171 B1 | 3/2005 | Nilsson | | 2003/0078064 A1 | 4/2003 | Chan |
| 6,865,395 B2 | 3/2005 | Riley | | 2003/0081557 A1 | 5/2003 | Mettala |
| 6,867,734 B2 | 3/2005 | Voor | | 2003/0101329 A1 | 5/2003 | Lahti |
| 6,873,854 B2 | 3/2005 | Crockett | | 2003/0101341 A1 | 5/2003 | Kettler |
| 6,885,940 B2 | 4/2005 | Brodie | | 2003/0103484 A1 | 6/2003 | Oommen |
| 6,888,497 B2 | 5/2005 | King | | 2003/0114157 A1 | 6/2003 | Spitz |
| 6,888,932 B2 | 5/2005 | Snip | | 2003/0119528 A1 | 6/2003 | Pew |
| 6,895,238 B2 | 5/2005 | Newell | | 2003/0151507 A1 * | 8/2003 | Andre et al. ............ 340/539.13 |
| 6,895,249 B2 | 5/2005 | Gaal | | 2003/0153340 A1 | 8/2003 | Crockett |
| 6,895,324 B2 | 5/2005 | Straub | | 2003/0153341 A1 | 8/2003 | Crockett |
| 6,900,758 B1 | 5/2005 | Mann | | 2003/0153342 A1 | 8/2003 | Crockett |
| 6,903,684 B1 | 6/2005 | Simic | | 2003/0153343 A1 | 8/2003 | Crockett |
| 6,904,029 B2 | 6/2005 | Fors | | 2003/0161298 A1 | 8/2003 | Bergman |

| | | |
|---|---|---|
| 2003/0204640 A1 | 10/2003 | Sahinaja |
| 2003/0223381 A1 | 12/2003 | Schroderus |
| 2004/0000989 A1* | 1/2004 | Davis ..................... 340/426.2 |
| 2004/0002326 A1 | 1/2004 | Maher |
| 2004/0044623 A1 | 3/2004 | Wake |
| 2004/0064550 A1 | 4/2004 | Sakata et al. |
| 2004/0068724 A1 | 4/2004 | Gardner |
| 2004/0090121 A1 | 5/2004 | Simonds et al. |
| 2004/0204806 A1* | 10/2004 | Chen et al. .................... 701/36 |
| 2004/0205151 A1 | 10/2004 | Sprigg |
| 2004/0229632 A1 | 11/2004 | Flynn |
| 2005/0003797 A1 | 1/2005 | Baldwin |
| 2005/0012591 A1* | 1/2005 | Tomljenovic et al. ...... 340/5.31 |
| 2005/0028034 A1 | 2/2005 | Gantman |
| 2005/0039178 A1 | 2/2005 | Marolia |
| 2005/0041578 A1 | 2/2005 | Huotari |
| 2005/0086340 A1 | 4/2005 | Kang |
| 2005/0086467 A1 | 4/2005 | Asokan |
| 2005/0112030 A1 | 5/2005 | Gauss |
| 2005/0136895 A1 | 6/2005 | Thenthiruperai |
| 2005/0172217 A1 | 8/2005 | Leung |
| 2005/0174987 A1 | 8/2005 | Raghav |
| 2005/0209995 A1 | 9/2005 | Aksu |
| 2005/0246217 A1 | 11/2005 | Horn |
| 2005/0259675 A1 | 11/2005 | Tuohino |
| 2006/0053225 A1 | 3/2006 | Poikleska |
| 2006/0058045 A1 | 3/2006 | Nilsen |
| 2006/0074618 A1 | 4/2006 | Miller |
| 2006/0090136 A1 | 4/2006 | Miller |
| 2006/0212558 A1 | 9/2006 | Sahinoja |
| 2006/0212562 A1 | 9/2006 | Kushwaha |
| 2006/0234639 A1 | 10/2006 | Kushwaha |
| 2006/0234698 A1 | 10/2006 | Folk |
| 2007/0026854 A1 | 2/2007 | Nath |
| 2007/0030539 A1 | 2/2007 | Nath |
| 2007/0030973 A1 | 2/2007 | Mikan |
| 2007/0042765 A1 | 2/2007 | Bailin |

\* cited by examiner

CELLULAR AUGMENTED VEHICLE ALARM NOTIFICATION TOGETHER WITH LOCATION SERVICES FOR POSITION OF AN ALARMING VEHICLE

This application claims priority from U.S. Provisional Application No. 60/723,448, entitled "Cellular Augmented Vehicle Alarm Notification Together With Location Services For Position of an Alarming Vehicle", filed Oct. 5, 2005, the entirety of which is expressly incorporated herein by reference.

BACKGROUND OF THE INVENTION

1. Field of the Invention

This invention relates generally to vehicle alarm systems. More particularly, it relates to notification with respect to vehicle alarm systems.

2. Background of Related Art

We've all heard them—vehicle alarms pulsing in the distance. Few stop to investigate, most walk by holding their ears.

There are currently two general types of vehicle alarms: one-way vehicle alarms, and two-way vehicle alarms. Both have a remote control-the two-way variety including a receiver, called a pager in the field, that receives RF signals directly from an alarm unit mounted in the vehicle.

One-way vehicle alarms have a remote control range of typically 50 meters to 100 meters. Other common features include door unlocked warning, vibration alarm and a trigger alarm that activates sound and flash, and cuts off the electric circuit.

Two-way vehicle alarms typically have a remote control range of 1,000 meters to 4,000 meters, and a direct alarm range of, e.g., 1,500. This alarm range relates to a maximum communication distance between the alarm unit in the vehicle to the remote control, usually via FM radio frequencies.

In any event, the remote pager in conventional vehicle alarm systems has a range that is limited by the capabilities of low power FM radio frequency (RF) technologies, e.g., to less than 1 mile.

Some advanced vehicle alarm features include anticarjacking arming delay, keyless entry, car finder, arm condition memory, smart chips (tamper memory), programmable air compressor central lock, anti-scanning function, engine starter, passive arming door lock on/off, ignition on/off with door lock/unlock, auto rearming, car finder, panic, valet mode, high sensitivity multi-tone siren, and silent alarm (e.g., vibration) for the remote pager.

Some advanced remote pagers for two-way vehicle alarms provide visual status detection of the vehicle, e.g., door open/closed, engine on/off, hood open/closed and trunk open/closed. Some also indicate visually of any sudden impacts or strong vibrations made to the vehicle body, including a high-frequency sensor that triggers when vehicle glass has been broken. Yet other vehicle alarm remote pagers include an antenna icon that indicates when it's within the operating and monitoring range.

After the remote pager goes outside the operating and monitoring range, the remote pager is no longer able to monitor the status of the vehicle. To inform the user of such loss, some remote pagers emit a beep or other warning when the remote pager goes out of range.

The present inventors have realized that standard (e.g., audible) vehicle alarms are largely ignored by the public and by the police.

A vehicle-based wireless emergency assistance system exists in the marketplace, but it is not an alarm system. Moreover, it requires a constantly manned 24/7 central call center, which results in an expensive service available to those with higher levels of disposable income to afford.

For instance, OnStar™ provides a cellular device in an automobile that notifies emergency personnel in the event of an accident. OnStar™ systems monitor equipped vehicles in real time, with a manned operations center employing many operators who talk with the driver on the cellular phone connection, interpret the driver's emergency needs, and dispatch calls to appropriate emergency personnel as necessary.

In operation, the driver of a vehicle with the pre-installed OnStar™ system is allowed to directly dial the OnStar™ call center from inside the vehicle. Nevertheless, OnStar™ provides no unattended vehicle or other alarm services, e.g., from theft, nor does it produce even just an audible vehicle alarm. The OnStar™ system works quite well as an emergency services device, but has no alarm functionality, requires constant 24/7 manning of a call operations center, and as a result is very expensive, with relatively few cars being equipped with such services.

Another existing commercial service, LoJack™, manufactures a vehicle location and recovery system. This type system uses direct RF frequency communication, not cellular technology. Moreover, before the LoJack™ device even operates it must be activated after a theft of the vehicle occurs. It is activated by a properly authorized operator using a particular radio frequency transmission before it will begin to announce itself. LoJack™ is not, in and of itself, an alarm system in that it doesn't notify an owner of a theft. In this respect, LoJack™ is agnostic to events which would otherwise cause a vehicle alarm system to alarm.

Existing vehicle systems are disadvantageous in that they require an owner to be within 4000 feet of the vehicle, or in the case of OnStar™ and LoJack™ do not provide alarm services at all. Moreover, services such as OnStar™ and LoJack™ have architecture such that it requires 24 hour/7 day a week manned call centers, creating a very expensive service that is so expensive that few can afford it. Furthermore, theft tracking systems such as LoJack™ are designed only for a specific kind of event (i.e., theft).

Other existing alarm systems sound an audible alarm indiscriminately to anyone in a vicinity of a vehicle, to which very few (if any) pay attention or become concerned for the vehicle, instead seeing such indiscriminate vehicle alarm systems more as an annoyance than theft prevention.

There is a need for a vehicle alarm system that is more effective in reaching the person or persons who either care most about the alarming vehicle, or have some level of responsibility for security of the alarming vehicle, without annoying or disturbing other members of the public.

SUMMARY OF THE INVENTION

In accordance with the principles of the present invention, a method for notifying a desired destination device of an alarming of a vehicle comprises receiving a cellular alarm notification signal wirelessly from an alarming vehicle, and requesting a position of a cellular transceiver of the alarming vehicle.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Most modern automobiles come factory equipped with remote locking capability and a built in alarm system. Generally these vehicle alarms monitor for excessive movement and/or illicit door opening (i.e. without using the key or remote fob). If the vehicle is perturbed badly enough, the vehicle alarm emits an audio alarm, usually in conjunction with the vehicle's horn 140. Thus, an audible alarm is emitted upon detection of illicit activity, and is continued to emit for a pre-designated period. When that period of time elapses, many vehicle alarms become quiescent for a second pre-designated period of time, and often are designed to start the audible alarm again if the vehicle is still unattended (e.g., key has not been placed into the ignition).

This type of vehicle alarm does more to annoy than to protect. Virtually everyone has become so inured to audible vehicle alarms that they are ignored and go unattended.

The problem is context. The inventors herein appreciate that audible vehicle alarms are almost never audible to those who would care the most about that vehicle: The vehicle's owner.

In accordance with aspects of the invention, wireless network technology is combined with a vehicle alarm system to provide direct wireless notification of a vehicle alarm event to the owner or other interested party of the vehicle. Otherwise conventional vehicle alarms are augmented with a cellular telephone circuit to provide an affordable system that sends an alarm's notifications directly to those who care the most about the particular vehicle issuing the alarm. In accordance with one aspect of the invention, vehicle alarm "announcements" are sent directly to the owner of a particular vehicle upon alarm, or to the police, or to building security to dispatch an investigative team, or to a building surveillance company to activate or monitor a relevant security camera, and/or to anybody else that the owner of the vehicle designates and identifies beforehand.

Figure 1:
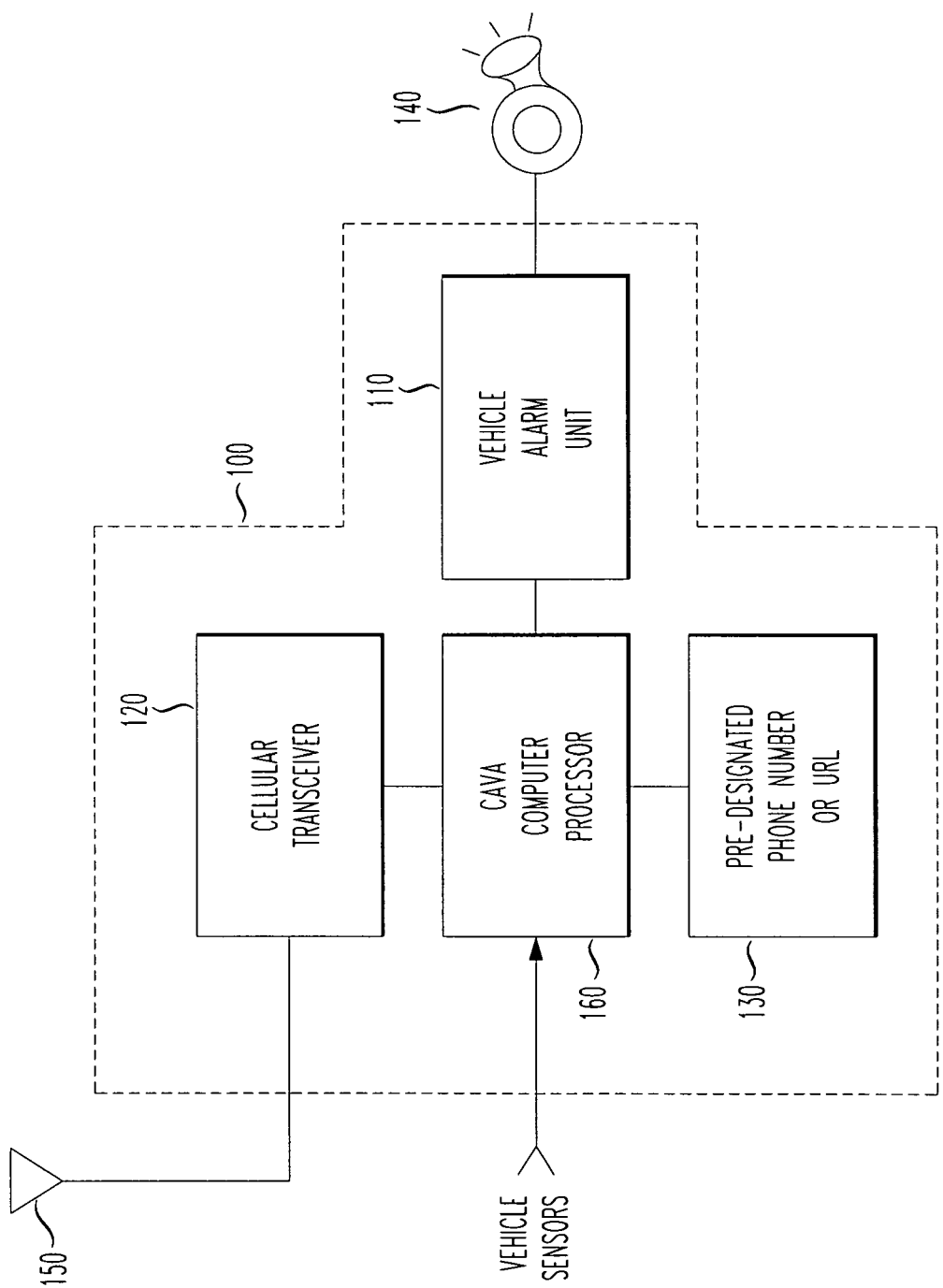
FIG. 1 shows a vehicle-mounted cellular augmented vehicle alarm (CAVA) system, in accordance with the principles of the present invention.

FIG. 1 shows a vehicle-mounted cellular augmented vehicle alarm (CAVA) system, in accordance with the principles of the present invention.

In particular, FIG. 1 shows a cellular augmented vehicle alarm 100 comprising an otherwise conventional vehicle alarm unit 110 interfaced with a computer processor 160 which is interfaced with non-volatile storage media 130 and a cellular transceiver 120.

The output of the vehicle alarm unit 110 to the computer processor 160 may be as simple as a set of discrete electrical lines (typically five or nine with which to represent four individual binary digits with parity for up to sixteen codes or eight individual binary digits with parity for up to 256 codes) which, in aggregate, represent multiple-bit "event code" or as complicated as a digital data bus between the alarm subsystem and the computer processor using any one of a number of standard interface protocols (i.e., RS-232, R2422, ARINC, TCP/IP, etc.). The computer processor 160 accesses the designated notification phone number or Uniform Resource Locator (URL) or Universal Resource Indicator (URI) saved in non-volatile storage 130 and initiates an appropriate cellular connection (i.e., cellular phone call) via the Cellular Transceiver 120 and Cellular Antenna 150.

The party or system receiving the cellular connection will note the identity of the calling vehicle via Automatic Number Identification (ANI) or CallerID™ or similar mechanism such that service can be provided.

Preferably, the vehicle alarm unit 110 includes sensor status information with the data sent to the computer processor 160 that is subsequently sent as part of the signal to the cellular transceiver 120. In turn, the cellular transceiver 120 preferably includes in a data payload portion of the phone call information regarding the sensor status (e.g., window broken, door opened, ignition started, etc.) This data payload may be provided in-band of the phone call, or out-of-band (e.g., in call related information such as CallerID information.)

Cellular augmented vehicle alarm systems 100 will likely be preset at the factory to call out to a number specifically reserved by cellular carriers for the purpose of supporting vehicle alarms (e.g., '211' for instance) but may need to be re-provisioned in order to function at the owner's locale. Said re-provisioning of the cellular augmented vehicle alarm system's 100 designated call out number or URL/RUI 130 may be input using suitable device. For instance, a text keyboard (e.g., touch screen or stylus activated screen such as with a Personal Digital Assistant (PDA)) may be mounted in the vehicle and interfaced to the cellular augmented vehicle alarm 100. Alternatively, the cellular augmented vehicle alarm 100 may accept calls from a telephone (i.e. cell phone or landline) during which the owner can provide the applicable call out number or URL/URI using the telephone's keypad.

Figure 2A:
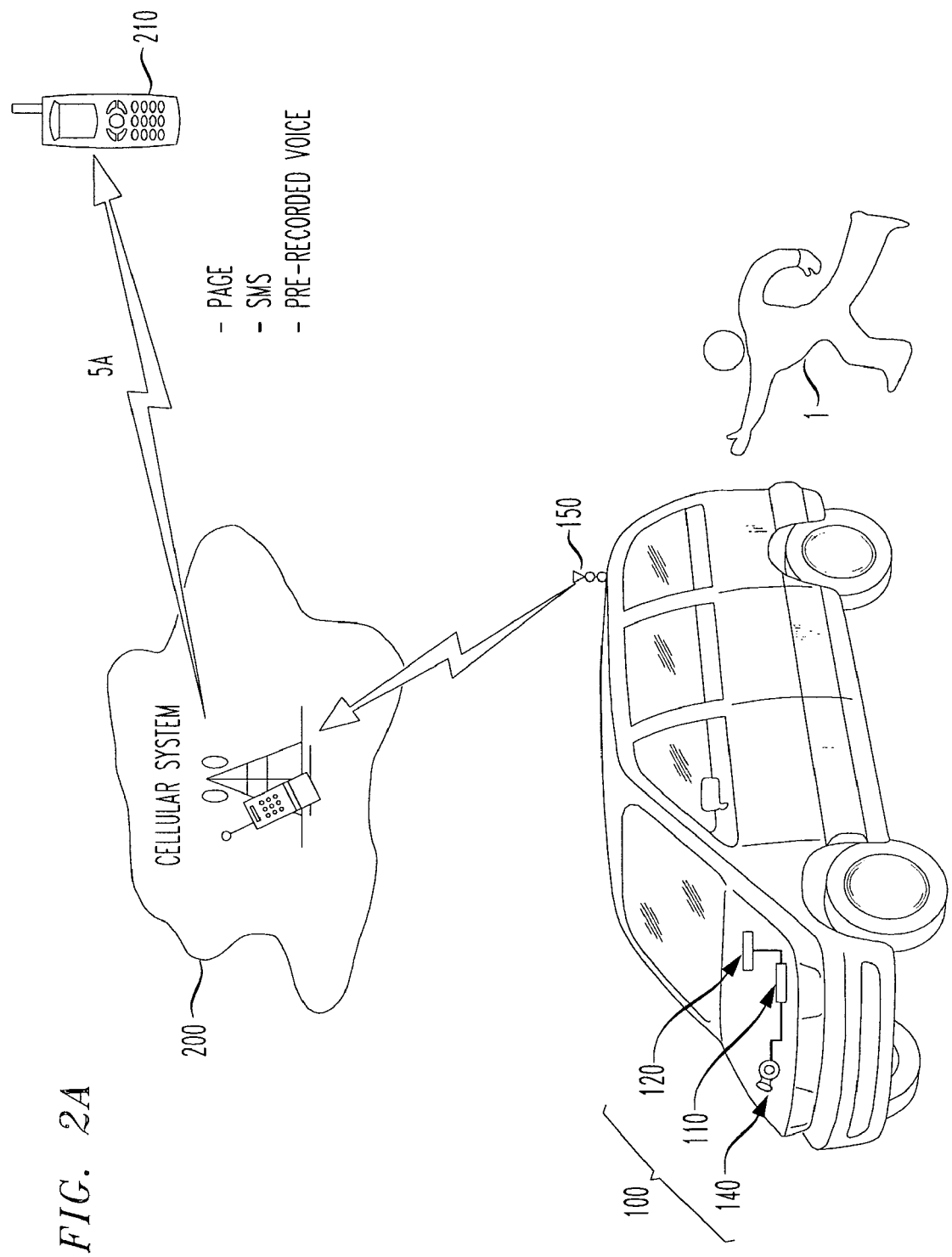
FIG. 2A shows a cellular augmented vehicle alarm sending an alarm notification to an owner's wireless device (e.g., cellular phone) using the cellular system, in accordance with the principles of the present invention.
Figure 2B:
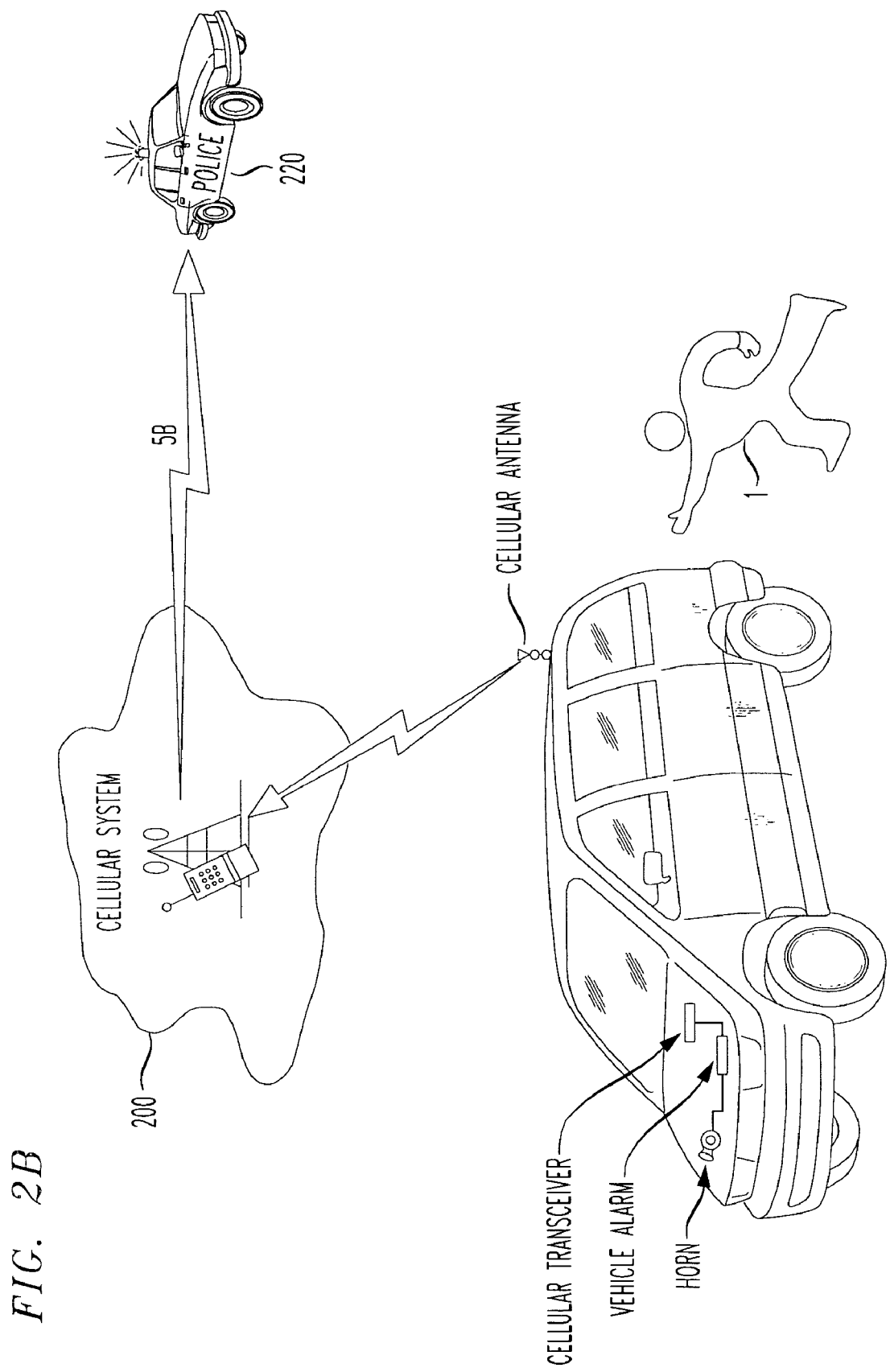
FIG. 2B shows a cellular augmented vehicle alarm sending an alarm notification to a police dispatch center using the cellular system, in accordance with the principles of the present invention.
Figure 2C:
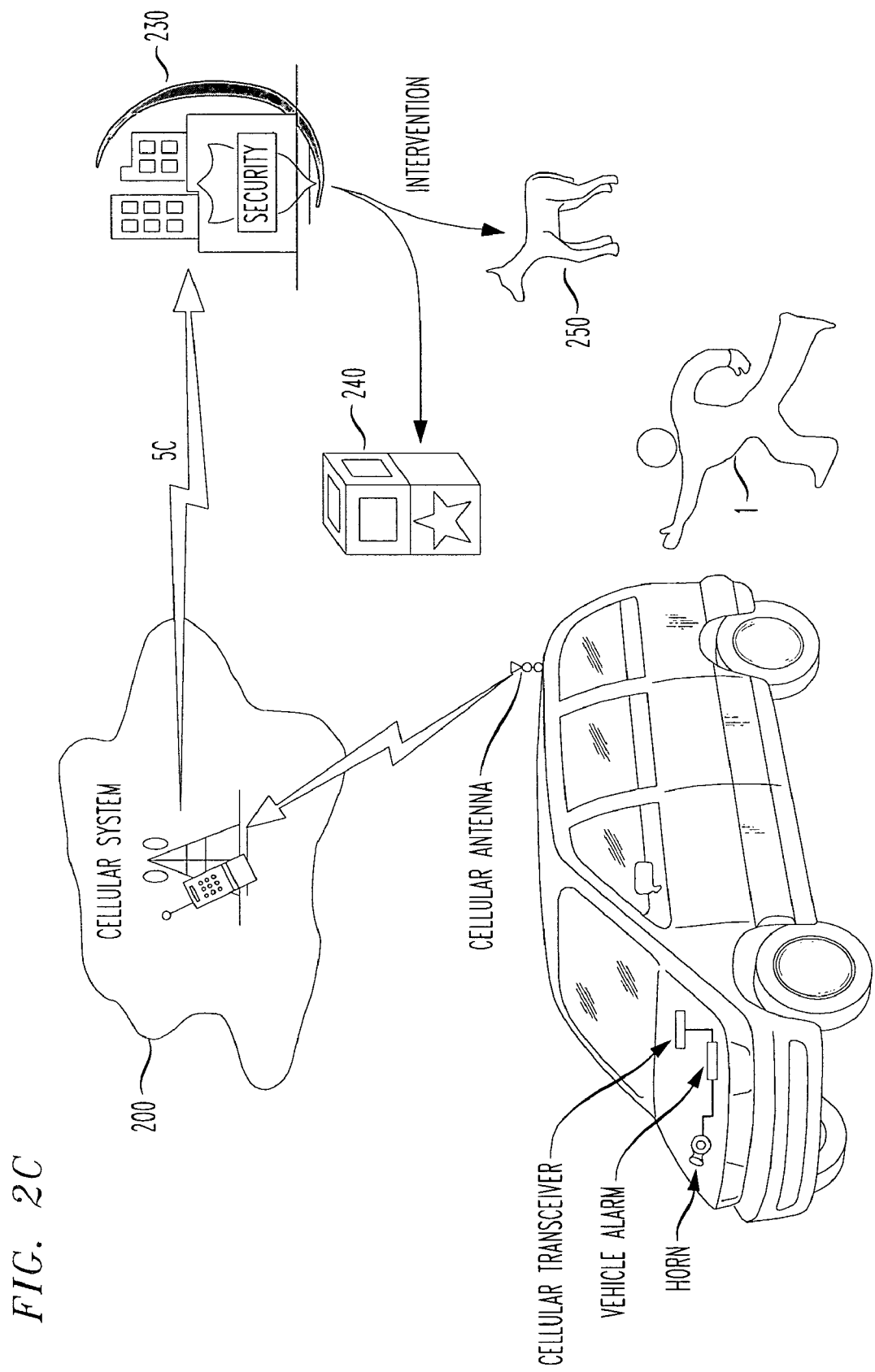
FIG. 2C shows a cellular augmented vehicle alarm sending an alarm notification to a security company responsible for the location that the vehicle is currently parked in, using the cellular system, in accordance with the principles of the present invention.
Figure 2D:
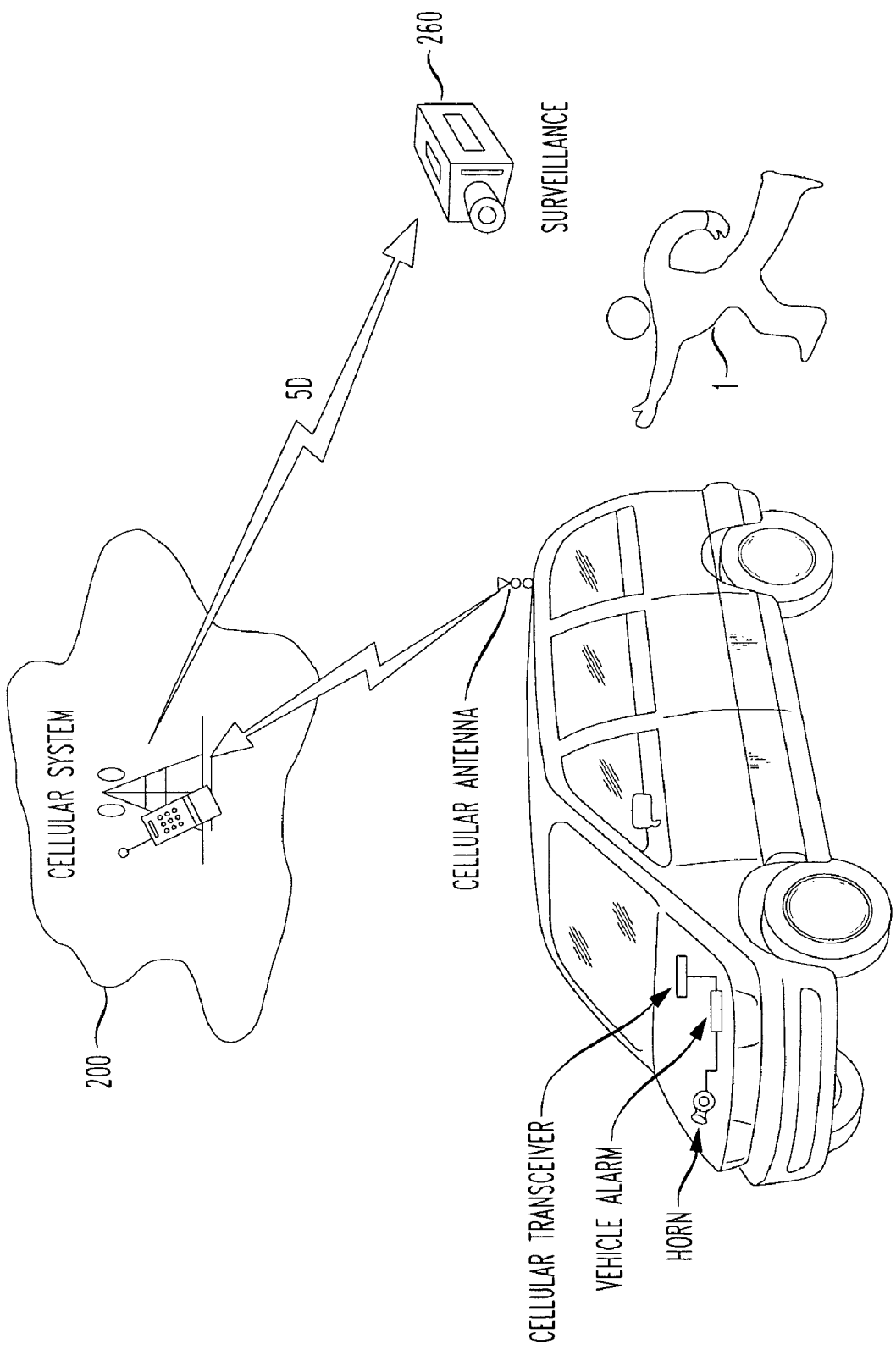
FIG. 2D shows a cellular augmented vehicle alarm sending an alarm notification to a surveillance camera overseeing the vehicle where it is parked, using the cellular system, in accordance with the principles of the present invention.

FIG. 2A shows a cellular augmented vehicle alarm sending an alarm notification to an owner's wireless device (e.g., cellular phone) using the cellular system, in accordance with the principles of the present invention. FIG. 2B shows a cellular augmented vehicle alarm sending an alarm notification to a police dispatch center using the cellular system. FIG. 2C shows a cellular augmented vehicle alarm sending an alarm notification to a security company responsible for the location that the vehicle is currently parked in, using the cellular system. FIG. 2D shows a cellular augmented vehicle alarm sending an alarm notification to a surveillance camera overseeing the vehicle where it is parked, using the cellular system.

In particular, as shown in FIG. 2A, the cellular augmented vehicle alarm 100—including a cellular antenna 150 and interfaced to a manufacturer-installed horn 140—shall be pre-provisioned by the vehicle's owner (or manufacturer or dealer) with the phone number or URL/URI to contact (210, 220, 230, or 260) upon detecting an alarm event 1.

Upon detection of an alarm event, the vehicle alarm unit 110 triggers the computer processor 160 to initiate a connection via the cellular transceiver 120 through the cellular system 200 to the pre-designated telephone number or URL/URI saved in non-volatile storage 130. In the given embodiment, the pre-designated telephone number may correspond to the owner's wireless phone 210, but may also correspond to any wireless phone, landline telephone, or special contact number (e.g., '211') provided by wireless carriers.

The alarm notification phone call can comprise a page call, a short message system (SMS) call, or a regular voice telephone call which, upon answering, plays a pre-recorded voice message relating to the alarm condition (e.g., "Your vehicle alarm has been activated.")

If desirable, the cellular augmented vehicle alarm 100 may activate the horn 140 of the vehicle, to provide audible alarm to the immediate area, as is otherwise conventional with vehicle alarm systems. However, this would be in addition to the an alarm notification call being transmitted over a cellular system. Thus, the cellular augmented vehicle alarm may still warn those within earshot of the vehicle that possible illegal activity is in progress, but would additionally ensure that corrective activity be initiated by also sending an explicit cellular alarm notification(s) to those most willing and able to react to the alarm.

In operation of the vehicle augmented cellular alarm 100, alarm activity detected by the vehicle augmented cellular alarm 100 causes an audible alarm to be output from the vehicle's horn 140, as is otherwise conventional. However, importantly, in accordance with the principles of the present invention, the vehicle augmented cellular alarm 100 may additionally, or alternatively, stimulate the cellular transceiver 120 to send a cellular message 4 to whomever has been designated for alarm notification, e.g., the vehicle's owner 210, the police dispatcher 220 (shown in FIG. 2B), apartment or building security 230 where the vehicle is parked (shown in FIG. 2C), a surveillance system 260 (shown in FIG. 2D), etc.

In the case of notification of a police dispatcher 220 or building security 230, physical intervention by way of a local watch station 240 and/or watchdog commander 250 may be dispatched in a very timely manner to the exact location of an alarming vehicle. This not only provides an opportunity to stop a crime in progress as it is occurring, but it also provides a significant deterrent to would-be criminals who would fear the fast-acting repercussions of a vehicle break-in (e.g., surveillance camera recording, alerting a watchman already on duty, etc.)

In addition to the status of the vehicle, the cellular alarm notification may provide a location of the alarming vehicle to the notified party, using a position of the vehicle obtained through appropriate location services provided in a wireless system to satisfy requirements for responding in a personal emergency to a requesting public safety access point (PSAP).

Figure 3:
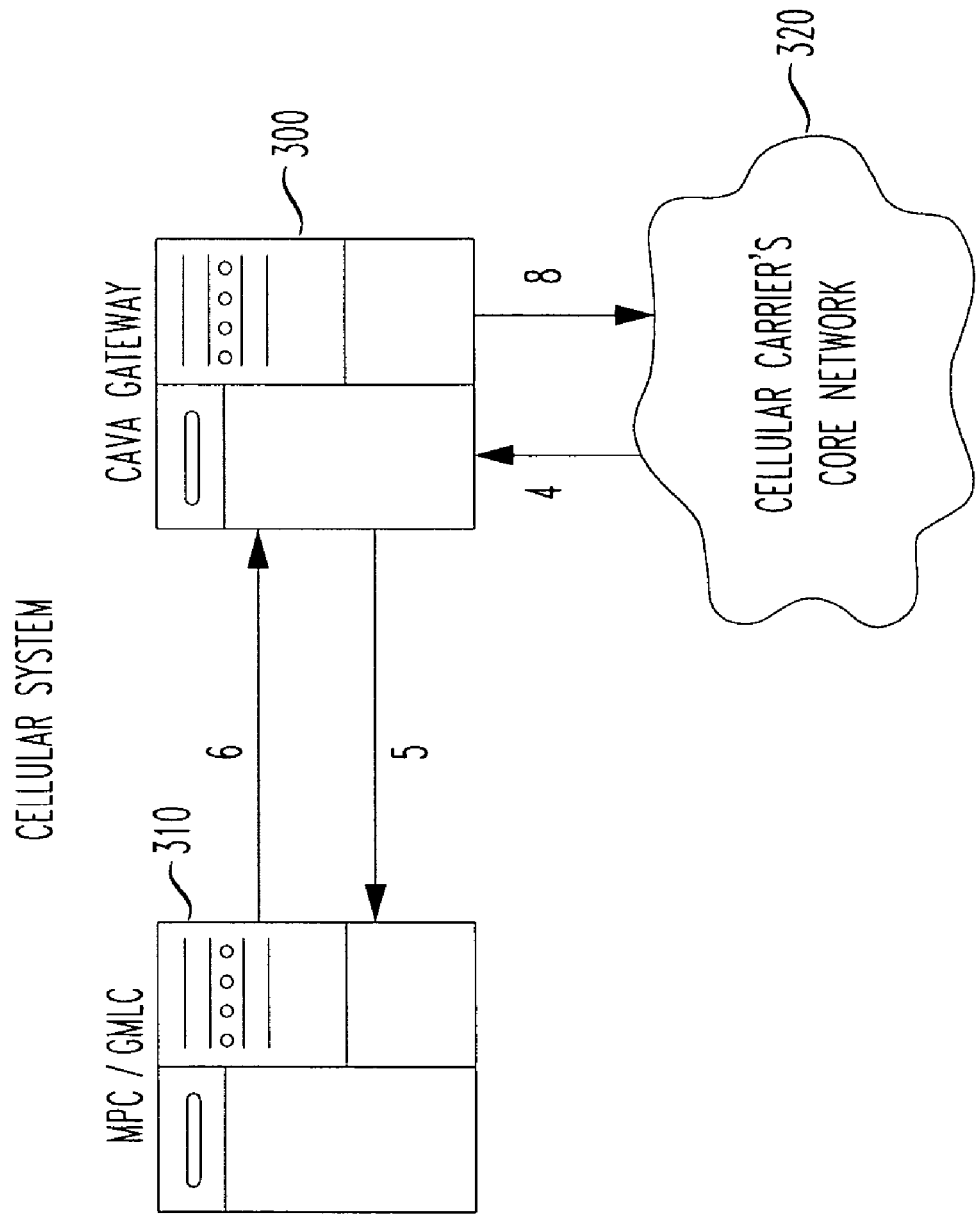
FIG. 3 shows implementation of a cellular augmented vehicle alarm gateway between the cellular system and a mobile positioning center (MPC), to provide location services with respect to the vehicle's position, such that a position of the vehicle can be given to a notified person, in accordance with the principles of the present invention.

FIG. 3 shows implementation of a cellular augmented vehicle alarm (CAVA) Gateway 300 between the cellular system 320 and a mobile positioning center (MPC) 310. The CAVA Gateway is intended to allow the location of the alarming vehicle to be seamlessly combined with the notification sent by the alarming vehicle into a single much more meaningful notification message that can be sent to one or more than one designee. What's more the CAVA Gateway can coordinate and facilitate non-telephone modes of communication (i.e. URLs and URIs) with service providers (i.e. security companies or 911 public safety access points) that will not saturate their normal telephone based lines of communication. More clearly stated, the CAVA Gateway when pre-designated as the call out number for one or more cellular augmented vehicle alarms will enhance the alarm notification with location information and will multiplex the single alarm notification call out to more than one destination.

The Mobile Positioning Center (MPC) 310 for CDMA cellular networks (or instead a Gateway Mobile Location Centre (GMLC) for GSM cellular networks) provides a location of a cellular subscriber in standardized ways.

The CAVA gateway 300 obtains position information from the MPC 310, and provides location services with respect to an alarming vehicle's position, such that a position of the alarming vehicle can be given to a notified person, in accordance with the principles of the present invention.

The present invention preferably also invokes location technologies used to direct vehicle alarm data over a wireless system to the proper, designated authorities. Contact numbers designated by vehicle alarm owners are managed as necessary, and notification dispatches are pre-designated.

In particular, as shown in FIG. 3, a vehicle alarm notification 4 may be directed to the CAVA Gateway 300 (if the CAVA Gateway has been pre-designated as the cellular augmented vehicle alarms call-out number) via the cellular network 320. Upon receipt of the alarming vehicle's notification, the CAVA Gateway 300 requests 5 the current location of the vehicle from the Mobile Position Center (MPC) 310 (or Gateway Mobile Location Centre (GMLC) for GSM networks). The MPC or GMLC returns the current location of the vehicle 6 to the CAVA Gateway 300. The CAVA Gateway 300 propagates the vehicle alarm notification along combined with the vehicle's current location 8 to whichever (and however many) destinations have been pre-designated within the CAVA Gateway by the vehicle's owner.

In accordance with another aspect of the invention, MPCs or GMLCs are adapted to enable practical dispatch of alarm notifications received from a cellular vehicle alarm system such as is described herein.

In this embodiment, preferably all alarm notification calls are forwarded to a centralized "cellular alarm dispatch server" or "CAVA gateway" 300. In this way, individual alarm notification calls are automatically dispatched via either phone lines or digital communication media to however many contact numbers the vehicle owner pre-designates.

The CAVA gateway 300 makes broadcasts of CAVA alarm notification calls practical. Coordinating CAVA dispatching through a centralized "cellular alarm dispatch server" or "CAVA gateway" 300 reduces the complexity of designating which phone numbers are to be notified upon a vehicle alarm event. The CAVA gateway 300 also allows the cellular alarm notifications to be executed in a manner that is practical for whomever receives the notification.

In a preferred embodiment, the CAVA gateway 300 includes a world wide web browser based interface with which CAVA vehicle owners can designate the phones numbers or URLs/URIs to which cellular alarm notifications are to be sent upon an alarm event.

The CAVA gateway 300 may redirect any attempts by a vehicle owner's vehicle to call 911 (or 112 in Europe) through an alternate mechanism, to prevent existing emergency service phone lines (e.g., at a PSAP) from becoming saturated with low priority vehicle alarm notification calls.

Each CAVA gateway 300 preferably also provides the ability to use the same kind of alternate dispatch mechanism for other services in the CAVA gateway's local area if specifically requested to do so.

For instance, if many occupants of a particular apartment complex designate the complex's security office as an alarm notification number to be called in the event of a cellular vehicular alarm, then that security office may opt to request an alternate form of cellular alarm notification. In such case, to receive an alternate form of notification of a vehicle alarm, the security office will be allowed to some alternate interface including but not limited to electronic mail (Email), electronic pager transmissions, or some form of hyper text markup language (HTML) "POST" to the security office's URL/URI including pertinent identification and location information.

Since the positional location of the vehicle issuing the alarm is important to whomever is notified, the CAVA gateway 300 must locate the calling CAVA vehicle prior to dispatching the notification. To accomplish this, the CAVA gateway 300 will obtain the positional location of the alarming vehicle by a request sent to the Mobile Positioning Center (MPC) 310.

The speed with which an MPC/GMLC 310 can locate the CAVA device (five to 60 seconds) is generally fast enough to satisfy the relatively low frequency of alarm notification events, and the relatively slow response time(s) of persons who may intervene (one to 30 minutes).

Figure 4A:
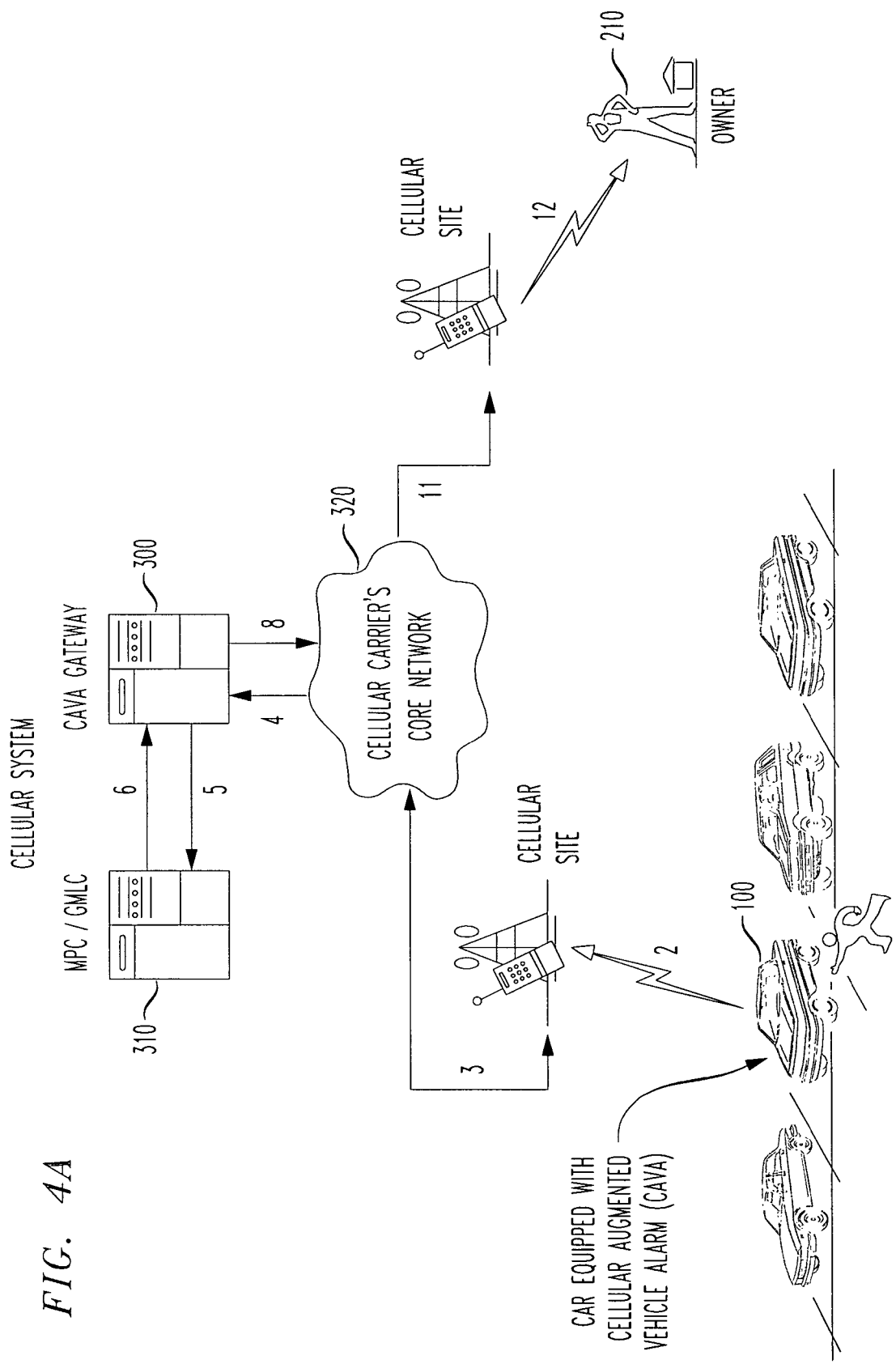
FIG. 4A shows implementation of a cellular augmented vehicle alarm gateway between the cellular system and a mobile positioning center (MPC), to provide a position of the vehicle to an owner upon an alarm event, in accordance with the principles of the present invention.

FIG. 4A shows implementation of a cellular augmented vehicle alarm gateway between the cellular system and a mobile positioning center (MPC), to provide a position of the vehicle to an owner upon an alarm event, in accordance with the principles of the present invention.

In particular, as shown in FIG. 4A, an owner with cellular telephone 210 receives a real-time cellular alarm notification 12 resulting from an alarm event transmitted 2 from a cellular augmented vehicle alarm (CAVA) 100. In the disclosed embodiment, the cellular alarm notification is an audibly silent notification transmitted over the cellular network 320. An audible alarm, e.g., from the horn of the vehicle, may additionally be output, in accordance with the principles of the present invention.

The cellular augmented vehicle alarm 100 sends a cellular alarm notification 2, which is relayed 3, 4 through the cellular network 320 to the CAVA gateway 300.

The CAVA gateway 320 contacts the Mobile Positioning Center (or GMLC in GSM systems) 5, 6 to determine the cellular augmented vehicle alarm's 100 current location.

The CAVA gateway 320 then dispatches one or more cellular alarm notifications to whomever the CAVA owner has pre-designated, and has stored in a suitable database or table accessible to the CAVA gateway 300. Pre-designated in this respect refers to at least one phone number (or URL/URI, e.g., in the case of Voice over Internet Protocol (VOIP) or one of the CAVA gateway's alternate forms of notification), e.g., in the case of voice over Internet Protocol (VoIP)) entered prior to the alarming activity sensed by the Cellular Augmented Vehicle Alarm (CAVA) 100.

A digital notification may be provided in addition to, or instead of, a phone call. Nevertheless, both a digital alarm notification such as an email, etc., and/or a phone call, both pass through the cellular network 320 in accordance with the invention, and thus are referred to herein collectively as cellular alarm notifications. If one or more of the designated notification recipients has requested an alternate notification method, the CAVA gateway 300 preferably establishes an appropriate digital connection to whatever service center has been arranged, with the presumption being that such service center (i.e. PSAP or other) will perform their own dispatch.

Figure 4B:
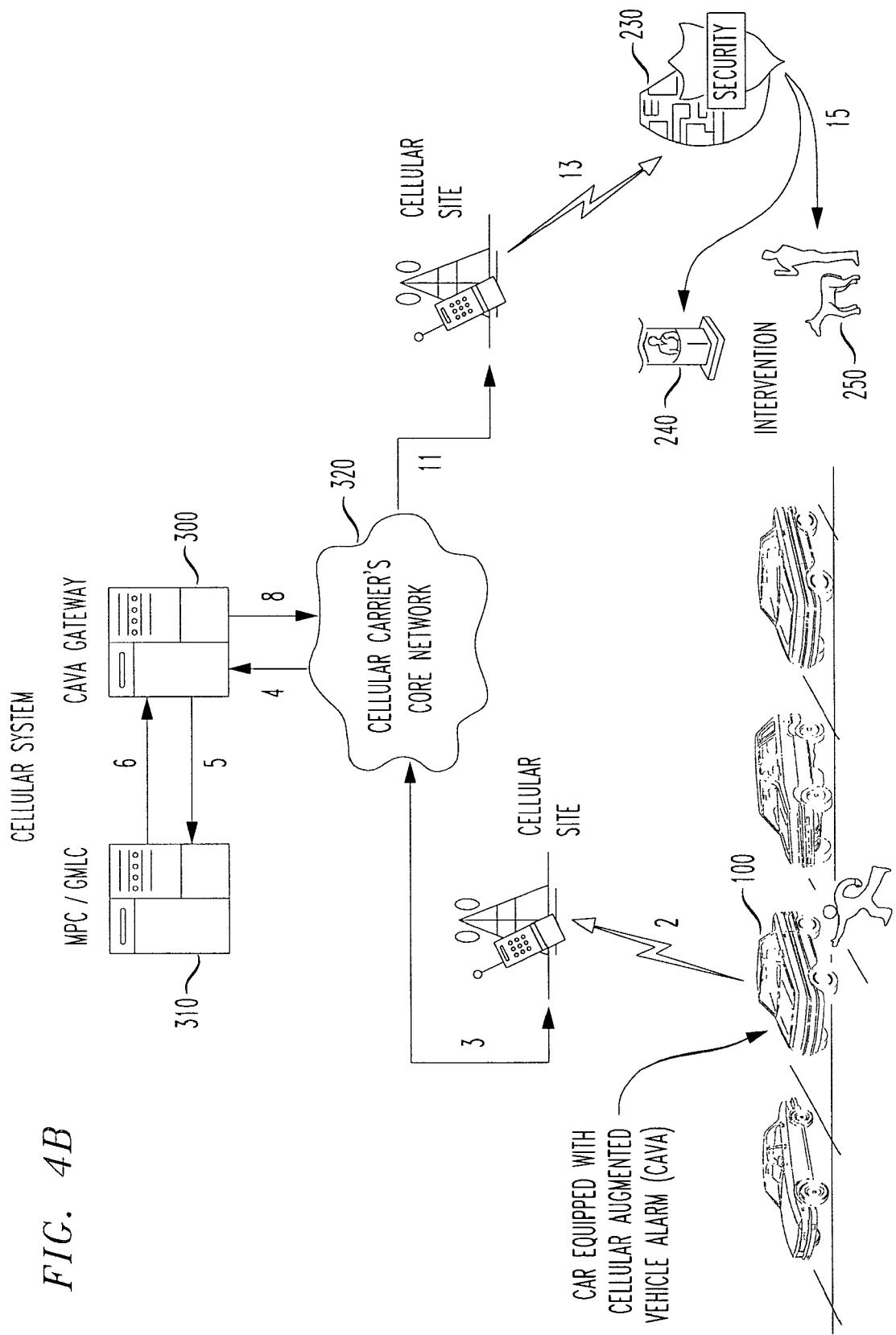
FIG. 4B shows implementation of a cellular augmented vehicle alarm gateway between the cellular system and a mobile positioning center (MPC), to provide a position of the vehicle to a security company overseeing the vehicle, upon an alarm event, in accordance with the principles of the present invention.

FIG. 4B shows implementation of a cellular augmented vehicle alarm gateway 300 between the cellular system 320 and a mobile positioning center (MPC) 310, to provide a position of the vehicle to a security company 230 overseeing the vehicle, upon an alarm event, in accordance with the principles of the present invention.

For those notification recipients that have not requested an alternate notification method, both a Short Message Service (SMS) text message and a pre-recorded voice message may be sent 8, 11, 12, 13 to the pre-designated alarm notification telephone number. Voice messaging may be augmented with synthesized voice to provide the CAVA device's precise location in addition to the alarm announcement.

The notified security company 230 may, if appropriate, dispatch an investigative person or team 250 to the given vehicle position, and/or an appropriate watch station 240 may be alerted to suspicious activity within their area of responsibility.

Figure 4C:
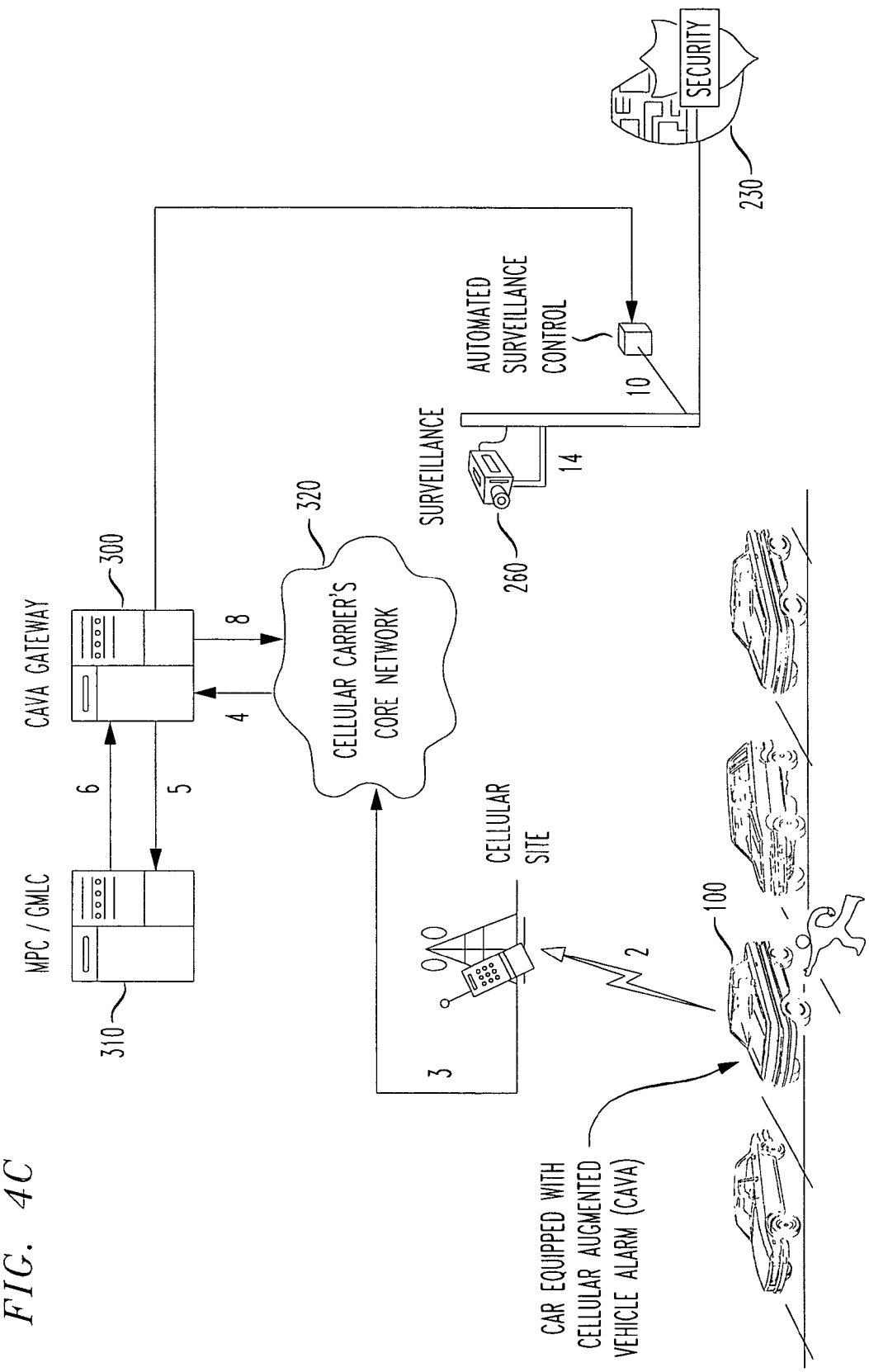
FIG. 4C shows implementation of a cellular augmented vehicle alarm gateway between the cellular system and a mobile positioning center (MPC), to provide a position of the vehicle to a surveillance camera dispatch center to activate a relevant camera, upon an alarm event, in accordance with the principles of the present invention.

FIG. 4C shows implementation of a cellular augmented vehicle alarm gateway 300 between the cellular system 320 and a mobile positioning center (MPC) 310, to provide a position of the vehicle to an automated surveillance control camera dispatch center 10 to activate a relevant surveillance camera 14 responsible for filming an area including the given position of the alarming vehicle upon an alarm event, in accordance with the principles of the present invention.

In response to receipt of a cellular alarm notification message or call, any available and applicable surveillance camera 14 can be activated, and or used to assess the nature of the alarming disturbance, and/or attempt to record video of whomever or whatever is responsible for the alarming disturbance from the given location.

Figure 4D:
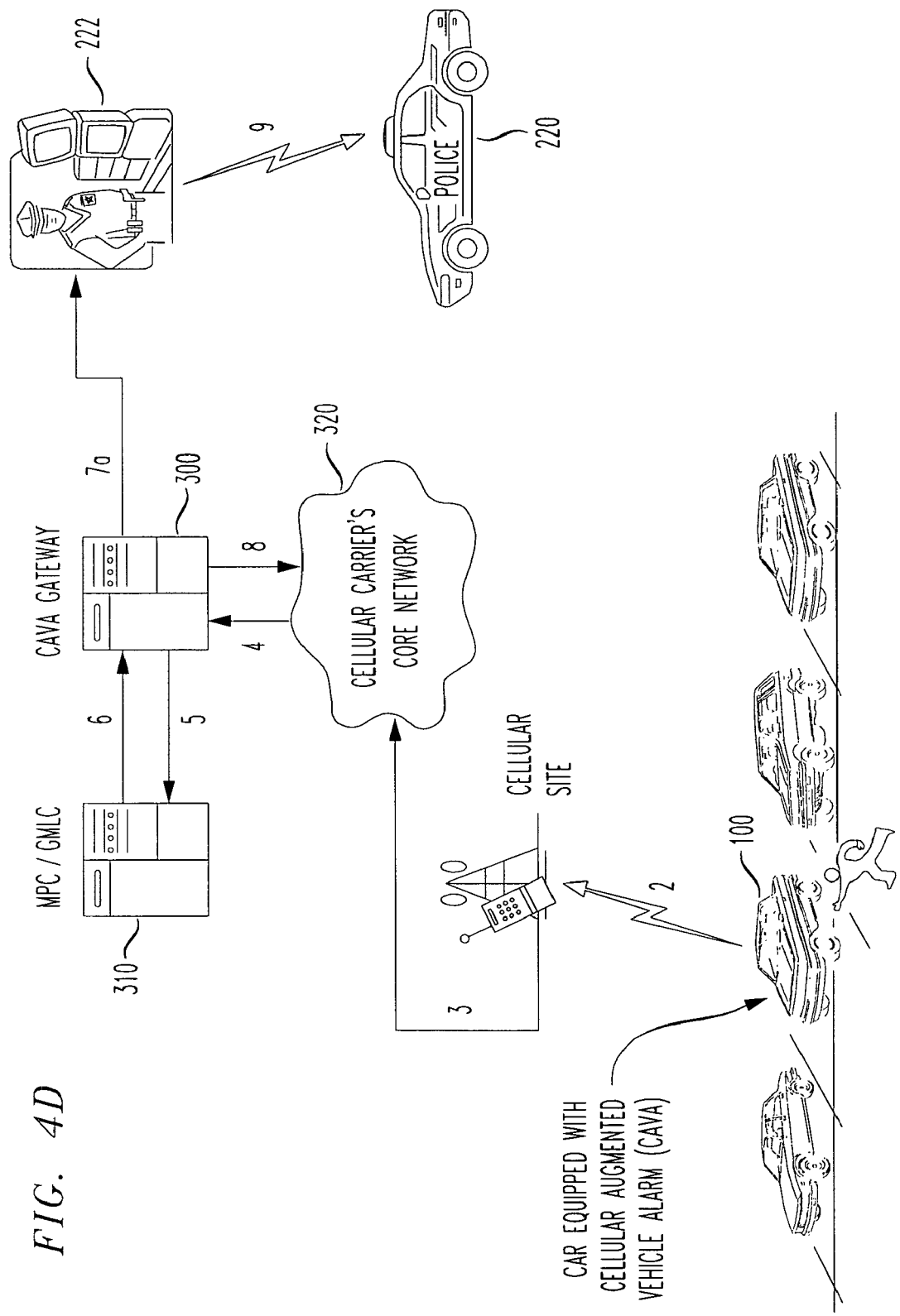
FIG. 4D shows implementation of a cellular augmented vehicle alarm gateway between the cellular system and a mobile positioning center (MPC), to provide a position of the vehicle to a public safety access point (PSAP), upon an alarm event, who in turn notifies the relevant police department, in accordance with the principles of the present invention.

FIG. 4D shows implementation of a cellular augmented vehicle alarm gateway 300 between the cellular system 320 and a mobile positioning center (MPC) 310, to provide a position of the vehicle to a public safety access point (PSAP) 222, upon an alarm event. The PSAP dispatch center 222, in turn, notifies the relevant police department 220 in the city responsible for the area identified by the obtained position received in association with the cellular alarm notification message, in accordance with the principles of the present invention.

It is likely that operators of the many public service access points (PSAPs) throughout the country will not want to overload their emergency service resources with thousands of spurious vehicle alarms on the same channels that they use to respond to 911 and E911 calls. However, separate data feeds may be established at the relevant PSAPs to transmit and receive "vehicle events", and may be handled accordingly. In such case, a police dispatch center may be outfitted with a direct connection to the relevant CAVA gateway(s).

The invention increases the utility and affordability of vehicle alarms (and simultaneously makes them less annoying) by modifying otherwise conventional vehicle alarm systems with a cellular network interface such that the owner of the vehicle (and/or whomever the owner pre-designates) will receive in real time a digital notification that their vehicle alarm has been activated. This real time alarm may be in lieu of the audible alarm conventionally found in vehicle alarm systems, though the cellular notification can be utilized together with an audible alarm acting as a deterrent to the thief in action.

As a benefit, the present invention makes the vehicle alarm a dependable deterrent by convincing those who would disturb/burglarize vehicles that someone will notice and pay attention.

While the invention has been described with reference to the exemplary embodiments thereof, those skilled in the art will be able to make various modifications to the described embodiments of the invention without departing from the true spirit and scope of the invention.

What is claimed is:

1. A method for notifying a desired destination device of an alarming vehicle, comprising:
   receiving, at a remote intermediary alarm gateway, a wireless cellular alarm notification from an alarming vehicle, said remote intermediary alarm gateway being remote from said alarming vehicle;
   requesting, via said remote intermediary alarm gateway, a geographic position of a cellular transceiver associated with said alarming vehicle from a positioning center remote from said alarming vehicle;
   combining, at said remote intermediary alarm gateway, said wireless cellular alarm notification and said geographic position to formulate a vehicle alarm notification; and
   transmitting said vehicle alarm notification from said remote intermediary alarm gateway to a pre-designated device.

2. The method for notifying a desired destination device of an alarming vehicle according to claim 1, further comprising:
   providing said vehicle alarm notification to a police dispatch center.

3. The method for notifying a desired destination device of an alarming vehicle according to claim 1, further comprising:
   providing said vehicle alarm notification to a pre-designated cell phone.

4. The method for notifying a desired destination device of an alarming vehicle according to claim 1, further comprising:
   providing said vehicle alarm notification to a security company responsible for said geographic position in which said alarming vehicle is parked.

5. The method for notifying a desired destination device of an alarming vehicle according to claim 1, further comprising:
   providing said vehicle alarm notification to a public safety access point (PSAP).

6. The method for notifying a desired destination device of an alarming vehicle according to claim 1, further comprising:
   providing said vehicle alarm notification to automatically activate surveillance by a camera having said alarming vehicle in view.

7. The method for notifying a desired destination device of an alarming vehicle according to claim 1, wherein:
   said geographic position of said cellular transceiver is provided by a Mobile Position Center (MPC) in a CDMA network.

8. The method for notifying a desired destination device of an alarming of a vehicle according to claim 1, wherein:
   said geographic position of said cellular transceiver is provided by a Gateway Mobile Location Centre (GMLC) in a GSM network.

9. The method for notifying a desired destination device of an alarming vehicle according to claim 1, further comprising:
   permitting specification of at least one destination to receive said vehicle alarm notification.

10. The method for notifying a desired destination device of an alarming vehicle according to claim 1, further comprising:
    permitting specification of a plurality of destinations to each receive said vehicle alarm notification.

11. The method for notifying a desired destination device of an alarming vehicle according to claim 1, further comprising:
    permitting specification of rules for relaying said transmitting said vehicle alarm notification.

12. Apparatus for notifying a desired destination device of an alarming vehicle, comprising:
    means for receiving a wireless cellular alarm notification from an alarming vehicle at a remote intermediary alarm gateway remote from said alarming vehicle;
    means for requesting, via said remote intermediary alarm gateway, a geographic position of a cellular transceiver of said alarming vehicle from a positioning center remote from said alarming vehicle;
    means for combining, at said remote intermediary alarm gateway, said wireless cellular alarm notification and said geographic position to formulate a vehicle alarm notification; and
    means for transmitting said vehicle alarm notification from said remote intermediary alarm gateway to a pre-designated device.

13. The apparatus for notifying a desired destination device of an alarming vehicle according to claim 12, further comprising:
    means for providing said vehicle alarm notification to a police dispatch center.

14. The apparatus for notifying a desired destination device of an alarming vehicle according to claim 12, further comprising:
    means for providing said vehicle alarm notification to a pre-designated cell phone.

15. The apparatus for notifying a desired destination device of an alarming vehicle according to claim 12, further comprising:
    means for providing said vehicle alarm notification to a security company responsible for said geographic position in which said alarming vehicle is parked.

16. The apparatus for notifying a desired destination device of an alarming vehicle according to claim 12, further comprising:
    means for providing said vehicle alarm notification to a public safety access point (PSAP).

17. The apparatus for notifying a desired destination device of an alarming vehicle according to claim 12, further comprising:

means for providing said vehicle alarm notification to automatically activate surveillance by a camera having said alarming vehicle in view.

18. The apparatus for notifying a desired destination device of an alarming vehicle according to claim 12, wherein:
said means for requesting said geographic position of a cellular transceiver from a Mobile Position Center (MPC) in a CDMA network.

19. The apparatus for notifying a desired destination device of an alarming vehicle according to claim 12, wherein:
said means for requesting said geographic position of a cellular transceiver from a Gateway Mobile Location Centre (GMLC) in a GSM network.

20. The apparatus for notifying a desired destination device of an alarming vehicle according to claim 12, wherein:
a plurality of destinations are specified to receive said vehicle alarm notification.

21. The apparatus for notifying a desired destination device of an alarming vehicle according to claim 12, wherein:
said received cellular alarm notification corresponds to rules regarding transmitting said vehicle alarm notification to another destination.

22. The apparatus for notifying a desired destination device of an alarming vehicle according to claim 12, wherein:
use of an alternate form of notification to a carrier is designated.

23. The apparatus for notifying a desired destination device of an alarming vehicle according to claim 22, wherein said alternate form of notification to a carrier is at least one of:
TCP/IP;
HTTP;
HTML;
Email; and
electronic pager.

24. A remote intermediary alarm gateway remote from an alarming vehicle, comprising:
an alarm receiving module to receive a wireless cellular alarm notification from said alarming vehicle;
an alarm request module to request a geographic position of a cellular transceiver associated with said alarming vehicle obtained from a positioning center remote from said alarming vehicle;
a combining module, at said remote intermediary alarm gateway, to combine said wireless cellular alarm notification and said geographic position to formulate a vehicle alarm notification; and
an alarm transmit module to transmit said vehicle alarm notification from said remote intermediary alarm gateway to a pre-designated device.

25. The remote intermediary alarm gateway remote from an alarming vehicle according to claim 24, further comprising:
a provider module to provide an alarm status and said geographic position of said alarming vehicle to a police dispatch center.

26. The remote intermediary alarm gateway remote from an alarming vehicle according to claim 24, further comprising:
a provider module to provide said vehicle alarm notification to a pre-designated cell phone.

27. The remote intermediary alarm gateway remote from an alarming vehicle according to claim 24, further comprising:
a provider module to provide said vehicle alarm notification to a security company responsible for said geographic position in which said alarming vehicle is parked.

28. The remote intermediary alarm gateway remote from an alarming vehicle according to claim 24, further comprising:
a provider module to provide said vehicle alarm notification to a public safety access point (PSAP).

29. The remote intermediary alarm gateway remote from an alarming vehicle according to claim 24, further comprising:
a provider module to provide said vehicle alarm notification to automatically activate surveillance by a camera having said alarming vehicle in view.

30. The remote intermediary alarm gateway remote from an alarming vehicle according to claim 24, wherein:
said geographic position of said cellular transceiver is provided by a Mobile Position Center (MPC) in a CDMA network.

31. The remote intermediary alarm gateway remote from an alarming vehicle according to claim 24, wherein:
said geographic position of said cellular transceiver is provided by a Gateway Mobile Location Centre (GMLC) in a GSM network.

32. The remote intermediary alarm gateway remote from an alarming vehicle according to claim 24, further comprising:
a permit module to permit pre-designated of at least one destination to receive said vehicle alarm notification.

33. The remote intermediary alarm gateway remote from an alarming vehicle according to claim 24, further comprising:
a permit module to permit pre-designated of a plurality of destinations to each receive said vehicle alarm notification.

34. The remote intermediary alarm gateway remote from an alarming vehicle according to claim 24, further comprising:
a permit module to permit pre-designated of rules for transmitting said vehicle alarm notification.

* * * * *